May 3, 1966  S. G. NEVIUS  3,249,854
DISPLACEMENT MEASURING DEVICE
Original Filed Nov. 1, 1957  2 Sheets-Sheet 1

INVENTOR.
SEARLE G. NEVIUS
BY R. E. Granque
Attorney

May 3, 1966     S. G. NEVIUS     3,249,854
DISPLACEMENT MEASURING DEVICE

Original Filed Nov. 1, 1957     2 Sheets-Sheet 2

INVENTOR.
SEARLE G. NEVIUS
BY
R.E. Geauque
Attorney

United States Patent Office 3,249,854
Patented May 3, 1966

3,249,854
DISPLACEMENT MEASURING DEVICE
Searle G. Nevius, Tujunga, Calif., assignor to Whittaker Corporation, a corporation of California
Original application Nov. 1, 1957, Ser. No. 694,044, now Patent No. 3,068,457, dated Dec. 11, 1962. Divided and this application July 16, 1962, Ser. No. 220,586
6 Claims. (Cl. 323—108)

This invention relates to measuring apparatus and more particularly to displacement measuring apparatus which produces electrical output signals as a function of mechanical displacement by phase measuring techniques. This application is a division of application Serial No. 694,044, now Patent No. 3,068,457.

Electrical measuring instruments for resolving mechanical displacements, either linear or angular, into electrical output signals providing a measure of the displacement have previously been proposed. In general, prior devices are comprised of stationary windings and relatively movable windings mutually coupled either capacitively or inductively. In these prior instruments variations in electrical coupling between the two members due to relative movement normally is measured by applying a driving signal to one of the relatively movable windings and observing or detecting the amplitude of the signal generated in the complementary winding as a measure of the relative displacement of the two elements.

A typical prior resolver of the capacitively coupled type is disclosed in U.S. Patent No. 2,674,729 to Carter, and transducers having inductive coupling are disclosed in U.S. Patents Nos. 2,650,352 and 2,671,892 to Childs.

Prior displacement resolving instruments such as are described in the foregoing are subject to a number of weaknesses and disadvantages seriously detracting from their accuracy of measurement and desirability of use. Probably the most troublesome effect arises by reason of the fact that in prior resolvers electrical output intelligence is in the form of amplitude modulation, and output signal amplitudes as actually obtained in such resolvers may be influenced directly or indirectly by many factors other than displacement of one resolver element with respect to the other. While the effects of certain of these sources of error can be minimized by careful design and use, the effects of other sources of error are difficult or impossible to control and all sources of error limit the inherent accuracy of measurement possible with the instrument.

Another important source of inaccuracy in prior resolvers of inductively coupled type lies in the inherent distributed capacitance betwen elements of the resolver, particularly between the driver and sensor elements thereof, and undesired variations in distributed capacitance between the relatively movable elements. These undesired capacitances and variations thereof cause capacitance voltages to appear as a component of the output signal voltage. Thus, the output signal voltage amplitude variation is related to the inductive coupling variation only to the extent by which the desired inductive coupling effect exceeds the undesired capacitive coupling effect. Changes in distributed capacitance are relatively large in those prior resolvers because of the large and changing area of overlay of the conductor elements of the driver and sensor elements.

Yet another source of inaccuracy found in some prior resolvers is caused by slight eccentricity of the elements in a circular configuration or slight misalignment in a linear arrangement. In these prior resolvers such irregularities cause first order inaccuracies to appear in the resolver output.

Prior resolvers designed to operate so as to produce amplitude variations to convey output intelligence have the disadvantage inherent in all amplitude varying signals in that the noise level of the system limits the ultimate resolution of the instrument.

It is the principal purpose and object of the present invention to provide electrical measuring instruments of the general type described in the foregoing, but free from the above-enumerated and other disadvantages of such prior instruments. This objective is realized in the measuring apparatus of the invention primarily by arrangement of the conductor elements of the resolver driver and sensor elements in a manner to provide a balanced output of the electromagnetically coupled signals and to permit cancellation of the electrostatically coupled signals between driver and sensor elements so that the amplitude of the output electrical signal will remain substantially constant for varying relative positions of the driver and sensor elements. This apparatus in its plurality of embodiments provides an extension of the present limits on the ease and accuracy of precision measurements. The present arrangement is designed to produce phase modulated output signals as a function of the relative displacement of the driver and sensor units. This and other aspects of the invention significantly contributing to accomplishment of its purpose will be fully disclosed hereinafter.

Advantages of resolver construction and operation in accordance with the invention are many and important. For example, since magnetic coupling is held constant even on relative movement of the driver and sensor elements, the improved resolvers provide accuracy and reliability of measurement unobtainable with prior instruments.

The phase modulated output signal which is characteristic of the resolvers of this invention is inherently desirable as compared to amplitude modulated signals because it can be more easily, and far more accurately, resolved and digitized, and also because it is adapted to use with digitizing systems requiring a phase modulated input such, for example, as certain of the improved digitizing systems disclosed in my copending application Serial No. 694,044, filed November 1, 1957 and now Patent No. 3,068,457.

Accordingly, it is a primary object of the invention to provide new and improved measuring instruments for electrically resolving angular and linear mechanical displacements.

It is another object of the invention to provide new and improved displacement measuring devices wherein the electrical output signals are phase modulated with respect to a cyclical input or other reference signal wherein said phase modulation is a defined function of the displacement.

Also an object of the invention is the provision of new and improved displacement measuring devices for resolving mechanical displacement into electrical output signals, wherein total electrical coupling remains constant throughout the entire range of displacement of the instrument, and wherein the electrical output remains substantially constant in amplitude over this entire range of displacement, and wherein the output intelligence is contained entirely in a phase modulated carrier.

It is also an object of the invention to provide new and improved displacement and resolving and measuring instruments having transmission line type resolver elements, properly terminated so as to minimize standing waves and resultant systematic error.

These and other objects, features and advantages of the invention will become more fully apparent by reference to the appended claims and the following detailed description when read in conjunction with the accompanying drawings, wherein:

While the particular resolver embodiment described hereinafter is of the linear displacement type, it is to be understood that the principles of resolver construction and operation in accordance with this embodiment of the invention are applicable also to resolvers of angular displacement type, wherein the inductor patterns are circularly disposed and mounted for relative rotary movement.

Figure 1:
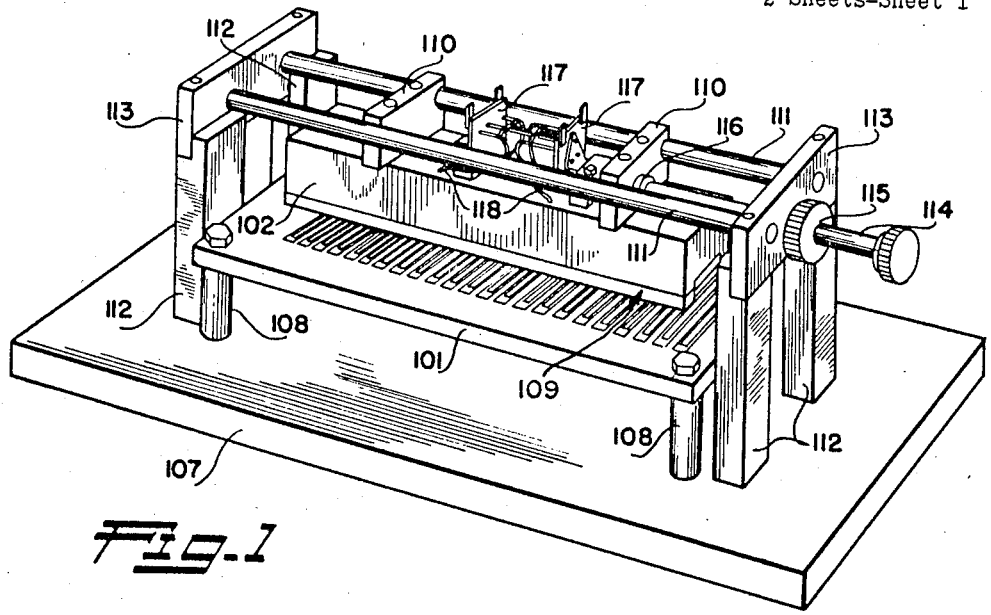
FIGURE 1 is a perspective view of a resolver for translating linear mechanical displacement to phase modulated electrical output signals in accordance with the invention.
Figure 2:
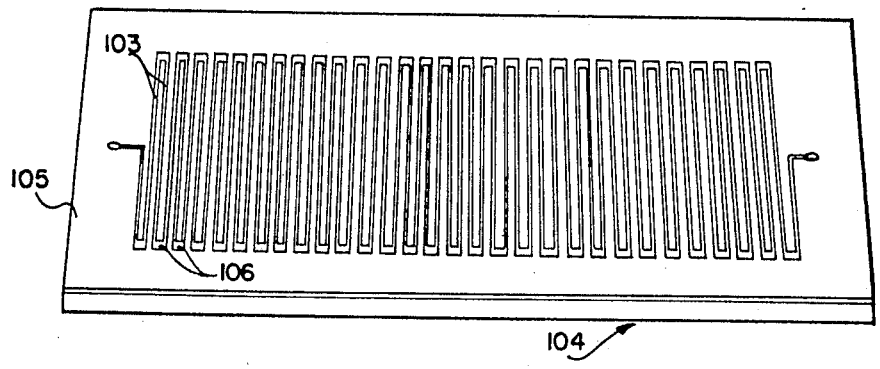
FIGURES 2 and 3 are perspective views of the stationary driver element and the movable sensor element respectively, of the resolver of FIGURE 1.

Referring to FIGURE 1, the principal elements comprise two conductor patterns. Coupling between the relatively movable element 102 and the relatively stationary element 101 is, in this embodiment, electromagnetic. The sensor pattern comprises a transmission line conductor 103 interconnected and generally disposed as shown in FIGURE 2 so as to produce a phase shifted carrier whose displacement is a function of the input (spatial) displacement. This is a current supply device dependent for its operation on the proper distribution of its elementary flux linkages.

With reference to FIGURE 2, the driver element designated generally by reference numeral 104 comprises a plurality of parallel coplanar conductor elements 103 extending back and forth in zig-zag fashion across a non-conductor base plate 105 and interconnected to form a series circuit. There are 100 conductor elements in this particular embodiment selected for illustration, thus comprising 50 "pole pairs" or pairs of adjacent conductors through which current flow will be generally oppositely directed.

The over-all dimensions of the driver and the dimensions of its components may vary over a wide range, dependent on a particular application for which the resolver is intended and also dependent on the desirable mode of operation for the particular application. The driver circuit shown for purposes of illustration may be five inches in length, with the wave pattern of its conductor elements having a peak-to-peak amplitude of two inches, a conductor width of 0.025 inch, and a spacing between conductors of 0.025 inch. At the peaks of conductor elements 103, connector strips 106 form a series connection between elements. The width of these strips may be varied to provide capacitive compensation for signal variation along the length of the driver should such a correction be found desirable during calibration or use.

Figure 3:
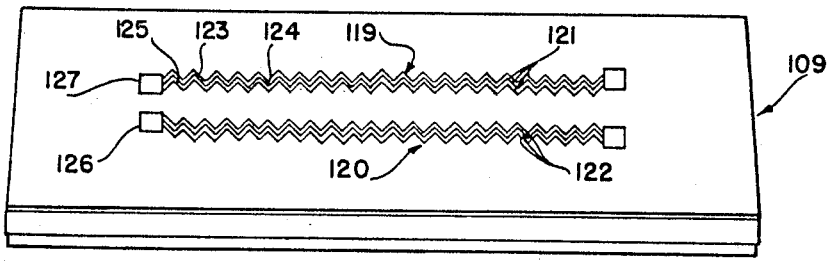

The driver and sensor elements may be provided with any suitable mounting arrangement permitting linear movement of the elements with respect to each other. One such mounting is illustrated in FIGURE 1, wherein the driver 101 is shown as fixedly supported above a base plate 107 as by pedestal means 108 one disposed at each of the four corners of the driver. Sensor elements 109 of FIGURES 1 and 3 are shown mounted for linear movement above and parallel to the driver by a pair of carriage elements 110 fixed to the sensor mounting plate (movable element 102) and slidable on a pair of guide rods 111. Rods 111 may be fixedly supported by any suitable means such as a post 112 and cross bars 113. A push rod 114 may be provided for connecting sensor 109 to the object whose movement is to be measured. This push rod may be slidable in an insulating bushing 115 mounted to one of the cross bars 113, or if desired, a push rod and bushing 115 may have threaded inter-engagement with each other. In this case, rotary coupling means are provided shown at 116 to permit free rotation of the push rod with respect to the sensor. Thus, depending on whether push rod 114 has slidable or threaded engagement in bushing 115, the resolver may be used for measurement of either linear or rotary displacement.

As shown in FIGURE 1 suitable connector lugs 117 may be mounted to the sensor mounting plate (102) so as to provide convenient means for connection to the sensor output leads 118. While in the example chosen the resolver may be arranged with the driver fixed and the sensor movable, it is to be understood that the resolver may be arranged with the driver movable and the sensor fixed.

Several embodiments of the sensor element may be constructed having various configurations and a wide range of overall dimensions. The sensor selected as an example and generally designated by reference numeral 109 in FIGURE 3 may consist of two circuits 119 and 120 each comprising a plurality of series connecting conductor elements 121 and 122 angularly disposed with respect to each other so as to form a plurality of zig-zag conductor paths 123, 124 and 125 generally parallel and spatially in phase with each other. These conductor paths may be electrically connected in parallel by conductor strips 126 and 127 as shown. In the particular embodiment selected for illustration, each conductor path 123, 124 and 125 defines a triangular wave. Two identical circuits are used which lie generally parallel and are phase-displaced 180 degrees in space for providing a balanced output of the electromagnetically coupled signals and to permit a cancellation of the electrostatically coupled signals.

The first step in calibrating and using a resolver is to determine a carrier drive signal wave length for the driver such that one wave length along the driver will effectively be just equal to the length of the sensor. Alternatively, the resolver may be operated at a frequency at which the length of the sensor will be just equal to one-half wave length along the driver. Due to the lack of symmetry, this mode of operation increases the possibility of systematic error due to inaccuracy in construction. However, this systematic error may be minimized by use of a configuration involving a pair of identical balanced drivers and a pair of identical parallel connected sensors one-half wave length long.

Figure 4:
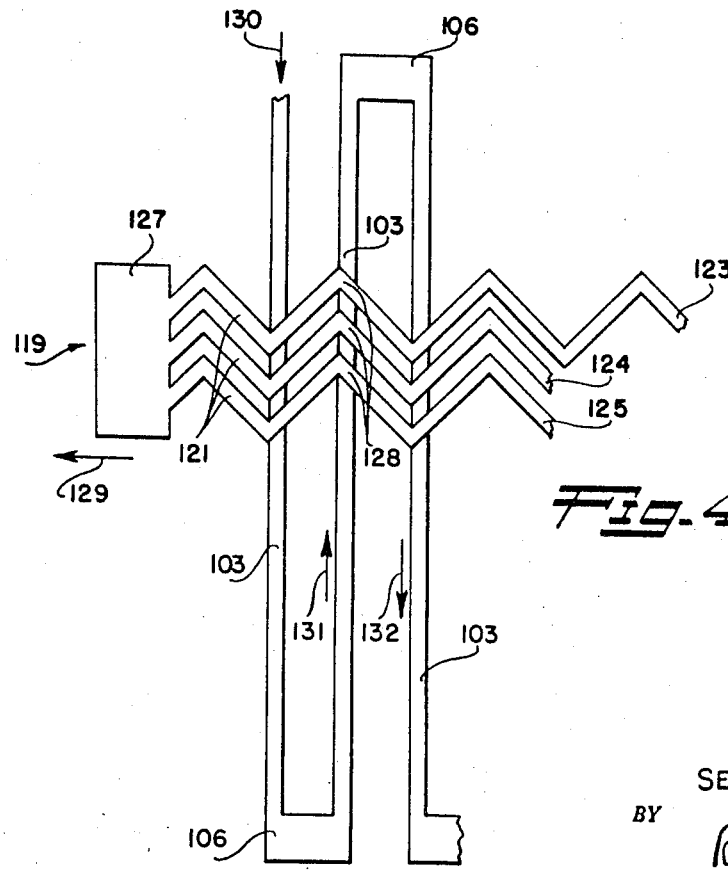
FIGURE 4 is a diagrammatic illustration of the relationship between the sensor and driver patterns for one part of the linear resolver at a given position.

As best shown in FIGURE 4, the total area of the portion of conductor elements 121 overlaying conductor elements 103 remains constant, at least to a first order, regardless of the relative position of one with the other, Therefore, the total amount of electromagnetic coupling between conductor elements 121 and element 103 remains fixed. Since the same is true for the portion of conductor elements 128 and element 103, the overall degree of coupling between conductor paths 123, 124 and 125 with conducting element 103 is substantially constant regardless of their relative position along a line of translation as indicated by arrow 129.

With the high frequency applied to this apparatus, sufficient coupling for practical use is obtained.

Now assuming that the sensor conductor 119 moves relative to element 103 in a direction indicated by arrow 129, and further assuming that the reference carrier signal is propagated in conductor element 103, in the direction indicated by arrow 130, then conductor elements 121 will appear to move in a direction opposite the direction of arrow 130 and coupling between conductor elements 121 and element 103 will occur at an earlier time as indicated by a relative phase shift in a leading direction. Similarly conductor elements 128 will appear to move in an opposite direction to conductor elements 121 but since the propagation of the reference carrier in element 103 also appears to be traveling in a direction opposite that of either adjacent elements 103, as shown by arrows 131 and 132, the net effect remains one of a relative phase lead for a mechanical displacement of the sensor circuit 119 in a direction relative to the stator indicated by arrow 129. It is understood that the operation of circuit element 120 is similar to that of circuit 119 and the two constitute a balanced pair.

Referring now to FIGURE 1, the sensor 102 may be displaced by movement of push rod 114 and it will be observed that 360 degree electrical phase shift results as a continuous variation or function of the linear displacement and that the cycle repeats in each unit displacement of the sensor which corresponds to each 0.1 inch displacement in the particular embodiment described for purposes of illustration. It will also be observed that the variation of phase angle with position, i.e., the angle of lead or lag of the output with respect to the input reference signal, will be sinusoidal. Since it is readily possible with conventional phase comparison apparatus to resolve the 360 degree phase shift per pole pair into at least 100 parts, and since there are 20 pole pairs over the two inch length of the sensor, this gives an overall resolution of 2000 parts for a two inch displacement of the sensor.

It will be understood that in practice the sensor is restricted in its movement so that no portion thereof moves beyond the ends of the driver. For best accuracy, the sensor is limited to a range of movement centered directly over the midpoint of the driver, thus assuring that the distributed capacitance between the sensor and driver remains substantially constant even with movement of the sensor. The amplitude of the output signal then will be substantially constant and the output intelligence entirely in the phase domain.

As noted previously, it is desirable to eliminate standing waves since these contribute to systematic errors in indication. The reduction in standing wave ratio is achieved by the use of a tuned resistance-capacitance circuit across the driver.

It is to be noted that since a large reactive component in the characteristic impedance may introduce frequency errors, the selection of suitable materials (particularly dielectrics) and dimensions and geometry of components is important. Also, the effect of selection of materials must be related to their influence on attenuation temperature characteristics and velocity of propagation.

Since the carrier signal for powering the resolver is chosen to have a wave length equal to (or a submultiple of) the length of the sensor a capacity probe may be used to pick off a signal from the end strips 106 of conductor 103 which will indicate a coarse phase shift for preventing ambiguity in reading the fine phase shift obtained over each pair of parallel elements of conductor 103. This probe may be mounted on the movable element 102 so as to couple only to end strips 106.

Various modifications are contemplated by those skilled in the art without departing from the spirit and scope of the invention as hereinafter defined by the appended claims.

What is claimed is:

1. In a device for providing an output signal shifted in phase with respect to a reference signal in proportion to a mechanical input, a pair of relatively movable members, first conducting means mounted on one of said members having its length compressed into a cyclic pattern, second conducting means mounted on the other of said members for movement adjacent to said first conducting means and electrically coupled thereto to provide an output signal whose phase is shifted relative to the phase of the reference signal by an amount proportional to mechanical displacement between said members, said first conducting means comprising a plurality of zig-zag elements adjacent second conducting means, each element overlying a substantially constant area of said second conducting means at all relative positions between said members.

2. A displacement measuring device comprising two relatively movable members, conducting means mounted on one of said members and comprising a transmission line having parallel segments connected in series, signal input means for driving said conducting means, and circuit means movable with the other of said members transversely of said segments and electrically coupled to said segments to obtain an output signal changing in phase with respect to said input signal in proportion to the mechanical displacement between said members, the frequency of said signal input means being such that one wave length along said transmission line will effectively be just equal to, or a submultiple of, the length of said circuit means.

3. A displacement measuring device as defined in claim 2 wherein said circuit means has a triangular wave shape of wave length equal to the spacing between said segments, the traverse movement of said circuit means causing change in the overlying position of said circuit means along the length of said segments to vary the phase of the output signal.

4. A displacement measuring device as defined in claim 2 wherein said circuit means is shaped to overlay an equal area of each of the said segments for all relative positions between said members.

5. A displacement measuring device as defined in claim 4 wherein said circuit means comprises a plurality of triangular shaped conductors positioned parallel to each other to obtain an average output signal.

6. A displacement measuring device as defined in claim 5 having two groups of said triangular shaped conductors, the wave form of one group being 180 electrical degrees out-of-phase with the wave form of the other group.

References Cited by the Examiner

UNITED STATES PATENTS 2,852,733   9/1958   Sorkin _____ 323—120

LLOYD McCOLLUM, *Primary Examiner.*

A. D. PELLINEN, D. L. RAE, *Assistant Examiners.*